(12) United States Patent
Yang

(10) Patent No.: US 11,050,516 B2
(45) Date of Patent: Jun. 29, 2021

(54) METHOD, NETWORK DEVICE AND TERMINAL DEVICE FOR TRANSMITTING FEEDBACK INFORMATION

(71) Applicant: GUANGDONG OPPO MOBILE TELECOMMUNICATIONS CORP., LTD., Guangdong (CN)

(72) Inventor: Ning Yang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/338,348

(22) PCT Filed: Jan. 5, 2017

(86) PCT No.: PCT/CN2017/070327
§ 371 (c)(1),
(2) Date: Mar. 29, 2019

(87) PCT Pub. No.: WO2018/126415
PCT Pub. Date: Jul. 12, 2018

(65) Prior Publication Data
US 2019/0229854 A1 Jul. 25, 2019

(51) Int. Cl.
*H04L 1/18* (2006.01)
*H04W 8/22* (2009.01)
(Continued)

(52) U.S. Cl.
CPC .......... *H04L 1/1812* (2013.01); *H04L 1/1607* (2013.01); *H04L 1/1664* (2013.01);
(Continued)

(58) Field of Classification Search
CPC ... H04L 1/1812; H04L 1/1861; H04L 1/1607; H04L 1/1664; H04L 1/18; H04W 76/27; H04W 8/22
(Continued)

(56) References Cited

U.S. PATENT DOCUMENTS

2005/0013263 A1 1/2005 Kim et al.
2006/0256758 A1* 11/2006 Malkamaki ............. H04L 49/90
370/335
(Continued)

FOREIGN PATENT DOCUMENTS

CN 101807984 8/2010
CN 102237956 11/2011
(Continued)

OTHER PUBLICATIONS

Lenovo, "Discussion on retransmission design for grant-free based UL transmission," 3GPP TSG RAN WG1 Meeting #86bis, R1-1609400, Oct. 2016, 3 pages.
(Continued)

*Primary Examiner* — Faisal Choudhury
(74) *Attorney, Agent, or Firm* — Hodgson Russ LLP

(57) ABSTRACT

Provided in the embodiments of the present application are a method, a network device and a terminal device for transmitting feedback information, the method including: receiving, by a terminal device, a downlink data channel sent by a network device, the downlink data channel comprising Hybrid Automatic Repeat reQuest (HARQ) feedback information, the HARQ feedback information comprising feedback information of uplink data of the at least one terminal device, and the terminal device being one of the at least one terminal device; and demodulating, by the terminal device, the downlink data channel to obtain the HARQ feedback information.

13 Claims, 3 Drawing Sheets

300

The terminal device receives a downlink data channel that is sent by the network device, where the downlink data channel includes Hybrid Automatic Repeat reQuest (HARQ) feedback information, the HARQ feedback information includes feedback information of uplink data of the at least one terminal device, and the terminal device is one of the at least one terminal device — 301

The terminal device demodulates the downlink data channel to obtain the HARQ feedback information — 302

(51) Int. Cl.
  *H04L 1/16* (2006.01)
  *H04W 76/27* (2018.01)
(52) U.S. Cl.
  CPC .............. *H04L 1/18* (2013.01); *H04L 1/1861* (2013.01); *H04W 8/22* (2013.01); *H04L 1/1867* (2013.01); *H04W 76/27* (2018.02)
(58) Field of Classification Search
  USPC ........................................................ 370/329
  See application file for complete search history.

(56) References Cited

U.S. PATENT DOCUMENTS

| | | | | |
|---|---|---|---|---|
| 2007/0113138 | A1* | 5/2007 | Kwon | H04L 1/1825 714/748 |
| 2009/0207771 | A1* | 8/2009 | Lindskog | H04L 12/1868 370/312 |
| 2009/0316643 | A1* | 12/2009 | Yamada | H04L 5/0041 370/329 |
| 2013/0301569 | A1 | 11/2013 | Wang et al. | |
| 2013/0322372 | A1* | 12/2013 | Kim | H04L 5/0035 370/329 |
| 2016/0198453 | A1* | 7/2016 | Hu | H04L 1/1864 370/349 |
| 2016/0242202 | A1* | 8/2016 | Matin | H04W 72/1273 |
| 2016/0309424 | A1 | 10/2016 | Dinan | |
| 2017/0331577 | A1* | 11/2017 | Parkvall | H04L 5/1469 |
| 2017/0373890 | A1* | 12/2017 | Fertonani | H04L 25/02 |

FOREIGN PATENT DOCUMENTS

| | | |
|---|---|---|
| CN | 103427948 | 12/2013 |
| CN | 103596278 | 2/2014 |
| CN | 104321997 | 1/2015 |
| CN | 104541471 | 4/2015 |
| CN | 105634689 | 6/2016 |
| WO | 2008115023 | 9/2008 |
| WO | 2015120605 | 8/2015 |

OTHER PUBLICATIONS

EPO, Office Action for EP Application No. 17890445.4, dated Sep. 24, 2019.
TIPO, Office Action for TW Application No. 107100061, dated Jul. 29, 2019.
WIPO, ISR for PCT/CN2017/070327, dated Sep. 28, 2017.
CNIPA, First Office Action for CN Application No. 201780055877.2, dated Dec. 23, 2019.
CNIPA, Notification to Grant Patent Right for Invention for CN Application No. 201780055877.2, dated Apr. 13, 2020.
CNIPA, Notification to Grant Patent Right for Invention for CN Application No. 201780055877.2, dated Mar. 13, 2020.

* cited by examiner

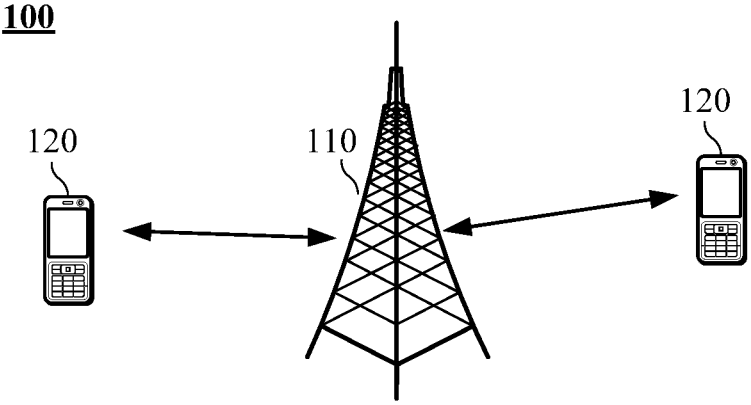

| A NETWORK DEVICE GENERATES HYBRID AUTOMATIC REPEAT REQUEST (HARQ) FEEDBACK INFORMATION, THE HARQ FEEDBACK INFORMATION COMPRISING FEEDBACK INFORMATION OF UPLINK DATA OF AT LEAST ONE TERMINAL DEVICE | 201 |

↓

| THE NETWORK DEVICE TRASNMITS THE HARQ FREEDBACK INFORMATION TO THE AT LEAST ONE TERMINAL DEVICE BY MEANS OF A DOWNLINK DATA CHANNEL | 202 |

| The terminal device receives a downlink data channel that is sent by the network device, where the downlink data channel includes Hybrid Automatic Repeat reQuest (HARQ) feedback information, the HARQ feedback information includes feedback information of uplink data of the at least one terminal device, and the terminal device is one of the at least one terminal device | 301 |

↓

| The terminal device demodulates the downlink data channel to obtain the HARQ feedback information | 302 |

FIG. 3

METHOD, NETWORK DEVICE AND TERMINAL DEVICE FOR TRANSMITTING FEEDBACK INFORMATION

CROSS-REFERENCE TO RELATED APPLICATION

This application is a National Stage Entry of International Application No. PCT/CN2017/070327, filed on Jan. 5, 2017, the entire disclosure of which is incorporated herein by reference.

TECHNICAL FIELD

The present application relates to the field of communications, and more particularly, to a method, network device, and terminal device for transmitting feedback information.

BACKGROUND

In the existing Long Term (LTE) system, the Hybrid Automatic Repeat reQuest (HARQ) feedback information uses the Physical Hybrid ARQ Indicator Channel (PHICH), the acknowledgment/negative acknowledgment (ACK/NACK) information is indicated by 1 bit, and the uplink HARQ of the LTE adopts a synchronous HARQ design, that is, the retransmission is performed at a fixed time relative to the initial transmission, and each PHICH corresponds to uplink data of one terminal device. Meanwhile, the Physical Downlink Control Channel (PDCCH) may also indicate a receiving state of the uplink data, for example, a New Data Indicator (NDI) carried in the uplink grant (Uplink grant) resource of the PDCCH indicates retransmission so as to identify the failure of uplink data demodulation, that is, using PDCCH to indicate retransmission is an "implicit" feedback.

The implicit feedback method of using the NDI in the Uplink grant of the PDCCH to indicate uplink retransmission is further extended in the New Radio (NR) system. For the NR system, the current consensus is that the uplink HARQ and downlink HARQ both use asynchronous HARQ, the dedicated feedback channel of the uplink data, that is, PHICH, is cancelled, and Uplink grant NDI is used to indicate uplink retransmission.

However, if a plurality of terminals use the competition mode for data transmission on the same uplink authorization resource, the terminal device cannot distinguish the data reception status of the network device, that is, whether the retransmission is caused by the competition failure or by that the network device does not successfully demodulate the data. In addition, for the last data packet transmitted by the terminal device, if the network device successfully demodulates the data packet, the terminal device does not receive the acknowledgement message of the data packet, which may cause unnecessary upper layer protocol processing delay, such as the release of the data packet in the buffer. Therefore, a new method for feeding back HARQ information is needed, which can explicitly indicate feedback information of uplink data with respect to the terminal device.

SUMMARY

The embodiments of the present application provide a method, a network device, and a terminal device for transmitting feedback information, which can explicitly indicate feedback information of uplink data for the terminal device.

In a first aspect, there is provided a method of transmitting feedback information, including: generating, by a network device, Hybrid Automatic Repeat reQuest (HARQ) feedback information, the HARQ feedback information including feedback information of uplink data of at least one terminal device; and sending, by the network device, the HARQ feedback information to the at least one terminal device through a downlink data channel.

In combination with the first aspect, in some implementation manners of the first aspect, the feedback information of the uplink data of each terminal device in the feedback information of the uplink data of the at least one terminal device includes at least one of the following:

acknowledgment/negative acknowledgment (ACK/NACK) of the uplink data of each terminal device, an identifier (ID) of a HARQ process of the uplink data of each terminal device, and identification information of each terminal device.

In combination with the first aspect, in some implementation manners of the first aspect, optionally, the HARQ feedback information is carried by a Media Access Control (MAC) Control Element (CE) of a MAC layer of the network device.

In combination with the first aspect, in some implementation manners of the first aspect, the feedback information of the uplink data of each terminal device corresponds to one MAC CE, and each terminal device determines MAC CE corresponding to each terminal device by a MAC subheader corresponding to the MAC CE.

In combination with the first aspect, in some implementation manners of the first aspect, the uplink data of a first terminal device of the at least one terminal device includes a plurality of uplink data, and the MAC CE corresponding to the feedback information of the uplink data of the first terminal device includes feedback information with respect to the plurality of uplink data.

In combination with the first aspect, in some implementation manners of the first aspect, the HARQ feedback information is carried by a MAC Protocol Data Unit (PDU) of the MAC layer of the network device.

In combination with the first aspect, in some implementation manners of the first aspect, the MAC PDU includes a MAC header and at least one MAC feedback information, the MAC header includes identification information of the at least one terminal device, and each of the at least one MAC feedback information corresponds to the feedback information of the uplink data of one terminal device.

In combination with the first aspect, in some implementation manners of the first aspect, the uplink data of the first terminal device of the at least one terminal device includes a plurality of uplink data, and the MAC feedback information corresponding to the first terminal device includes the feedback information with respect to the plurality of uplink data.

In combination with the first aspect, in some implementation manners of the first aspect, the at least one terminal device includes a plurality of terminal devices, and the HARQ feedback information includes the feedback information of the uplink data of the plurality of terminal devices, the method further including:

sending, by the network device, indication information to the plurality of terminal devices by using a shared control channel of the plurality of terminal devices, the indication information indicating the plurality of terminal devices to receive the HARQ feedback information on the downlink data channel.

In combination with the first aspect, in some implementation manners of the first aspect, the at least one terminal device includes one terminal device, and the HARQ feedback information includes the feedback information of the uplink data of the one terminal device, the method further including:

sending, by the network device, indication information to the one terminal device by using a dedicated control channel of the one terminal device, the indication information indicating the one terminal device to receive the HARQ feedback information on the downlink data channel.

In combination with the first aspect, in some implementation manners of the first aspect, the method further includes:

notifying, by the network device, a dedicated identifier of the at least one terminal device to the at least one terminal device by using a high layer signaling, the dedicated identifier of the at least one terminal device being used to indicate the at least one terminal device to demodulate the downlink data channel including the HARQ feedback information.

In combination with the first aspect, in some implementation manners of the first aspect, optionally, the high layer signaling is a Radio Resource Control (RRC) signaling.

In combination with the first aspect, in some implementation manners of the first aspect, the at least one terminal device includes one terminal device, and the dedicated identifier of the at least one terminal device is the identification information of the one terminal device.

In combination with the first aspect, in some implementation manners of the first aspect, the identification information of the one terminal device is a Radio Network Temporary Identifier (RNTI) of the one terminal device.

In combination with the first aspect, in some implementation manners of the first aspect, the at least one terminal device includes a plurality of terminal devices, and the dedicated identifier of the at least one terminal device is shared identification information of the plurality of terminal devices.

In combination with the first aspect, in some implementation manners of the first aspect, the shared identification information of the plurality of terminal devices is a shared RNTI of the plurality of terminal devices.

According to a second aspect, there is provided a method for transmitting feedback information, including: receiving, by a terminal device, a downlink data channel sent by a network device, the downlink data channel including Hybrid Automatic Repeat reQuest (HARQ) feedback information, the HARQ feedback information including feedback information of uplink data of the at least one terminal device, and the terminal device being one of the at least one terminal device; and demodulating, by the terminal device, the downlink data channel to obtain the HARQ feedback information.

In combination with the second aspect, in some implementation manners of the second aspect, the feedback information of the uplink data of each terminal device in the feedback information of the uplink data of the at least one terminal device includes at least one of the following:

acknowledgment/negative acknowledgment (ACK/NACK) of the uplink data of each terminal device, an identifier (ID) of a HARQ process of the uplink data of each terminal device, and identification information of each terminal device.

In combination with the second aspect, in some implementation manners of the second aspect, the HARQ feedback information is carried by a Media Access Control (MAC) Control Element (CE) of a MAC layer of the network device.

In combination with the second aspect, in some implementation manners of the second aspect, the feedback information of the uplink data of each terminal device corresponds to one MAC CE, and each terminal device determines MAC CE corresponding to each terminal device by a MAC subheader corresponding to the MAC CE.

In combination with the second aspect, in some implementation manners of the second aspect, the uplink data of a first terminal device of the at least one terminal device includes a plurality of uplink data, and the MAC CE corresponding to the feedback information of the uplink data of the first terminal device includes feedback information with respect to the plurality of uplink data.

In combination with the second aspect, in some implementation manners of the second aspect, the HARQ feedback information is carried by a MAC Protocol Data Unit (PDU) of the MAC layer of the network device.

In combination with the second aspect, in some implementation manners of the second aspect, the MAC PDU includes a MAC header and at least one MAC feedback information, the MAC header includes identification information of the at least one terminal device, and each of the at least one MAC feedback information corresponds to the feedback information of the uplink data of one terminal device.

In combination with the second aspect, in some implementation manners of the second aspect, the uplink data of the first terminal device of the at least one terminal device includes a plurality of uplink data, and the MAC feedback information corresponding to the first terminal device includes the feedback information with respect to the plurality of uplink data.

In combination with the second aspect, in some implementation manners of the second aspect, the method further includes:

when the terminal device receives the MAC PDU including the HARQ feedback information, not replying with a response message.

In combination with the second aspect, in some implementation manners of the second aspect, the at least one terminal device includes a plurality of terminal devices, and the HARQ feedback information includes the feedback information of the uplink data of the plurality of terminal devices, the method further including:

receiving, by the terminal device, indication information that is sent by the network device by using a shared control channel of the plurality of terminal devices, the indication information indicating the plurality of terminal devices to receive the HARQ feedback information on the downlink data channel.

In combination with the second aspect, in some implementation manners of the second aspect, the at least one terminal device includes one terminal device, and the HARQ feedback information includes the feedback information of the uplink data of the one terminal device, the method further including:

receiving, by the terminal device, indication information that is sent by the network device by using a dedicated control channel of the one terminal device, the indication information indicating the one terminal device to receive the HARQ feedback information on the downlink data channel.

In combination with the second aspect, in some implementation manners of the second aspect, the method further includes:

receiving, by the terminal device, a high layer signaling sent by the network device, the high layer signaling including a dedicated identifier of the at least one terminal device, and the dedicated identifier of the at least one terminal device being used to indicate the at least one terminal device to demodulate the downlink data channel including the HARQ feedback information.

In combination with the second aspect, in some implementation manners of the second aspect, the high layer signaling is a Radio Resource Control (RRC) signaling.

In combination with the second aspect, in some implementation manners of the second aspect, the at least one terminal device includes one terminal device, and the dedicated identifier of the at least one terminal device is the identification information of the one terminal device.

In combination with the second aspect, in some implementation manners of the second aspect, the identification information of the one terminal device is a Radio Network Temporary Identifier (RNTI) of the one terminal device.

In combination with the second aspect, in some implementation manners of the second aspect, the at least one terminal device includes a plurality of terminal devices, and the dedicated identifier of the at least one terminal device is shared identification information of the plurality of terminal devices.

In combination with the second aspect, in some implementation manners of the second aspect, the shared identification information of the plurality of terminal devices is a shared RNTI of the plurality of terminal devices.

In combination with the second aspect, in some implementation manners of the second aspect, the method further includes:

demodulating, by the terminal device, a control channel according to the dedicated identifier of the at least one terminal device; and demodulating the downlink data channel including the HARQ feedback information according to the demodulated control channel.

In combination with the second aspect, in some implementation manners of the second aspect, the method further includes:

when the terminal device does not successfully demodulate the downlink data channel, not replying, by the terminal device, with a response message.

According to a third aspect, there is provided a network device, including units for performing the method of the first aspect.

According to a fourth aspect, there is provided a terminal device, including units for performing the method of the second aspect.

According to a fifth aspect, there is provided a network device is provided, including a memory, a processor, and a transceiver, wherein the memory is configured to store a program, the processor is configured to execute the program, and when the program is executed, the processor performs the method of the first aspect based on the transceiver.

According to a sixth aspect, there is provided a terminal device, including a memory, a processor, and a transceiver, wherein the memory is configured to store a program, the processor is configured to execute the program, and when the program is executed, the processor performs the method of the second aspect based on the transceiver.

According to a seventh aspect, there is provided a computer readable medium storing program code for execution by a terminal device, the program code including instructions for performing the method of the first aspect.

According to an eighth aspect, there is provided a computer readable medium storing program code for execution by a network device, the program code including instructions for performing the method of the second aspect.

Based on the foregoing technical solutions, in the method for transmitting feedback information in the embodiments of the present application, the network device may generate HARQ feedback information, the HARQ feedback information including feedback information of uplink data of at least one terminal device, and then the network device may sends the HARQ feedback information to the at least one terminal device through the downlink data channel, so that the feedback information of the uplink data for each terminal device can be explicitly indicated. Further, the control channel overhead can be saved by the network device transmitting the HARQ feedback information through the downlink data channel.

BRIEF DESCRIPTION OF THE DRAWINGS

FIG. 1 is a schematic diagram of a communication system according to an embodiment of the present application.

FIG. 2 is a schematic flowchart of a method for transmitting feedback information according to an embodiment of the present application.

FIG. 3 is a schematic flowchart of a method for transmitting feedback information according to an embodiment of the present application.

DETAILED DESCRIPTION

Figure 4:
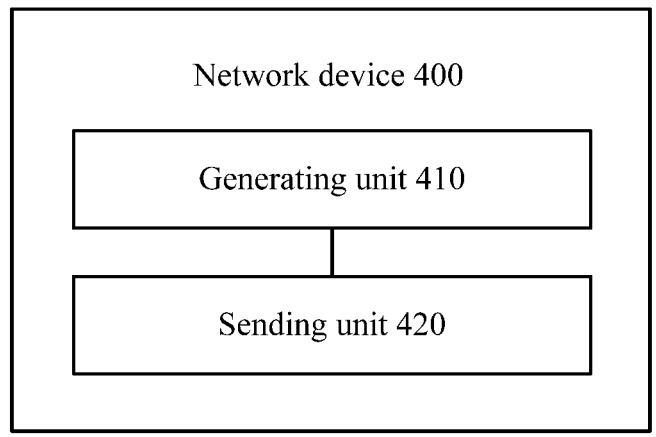
FIG. 4 is a schematic block diagram of a network device according to an embodiment of the present application.

The technical solutions in the embodiments of the present disclosure will be described below with reference to the accompanying drawings.

The technical solutions of the embodiments of the present disclosure may be applied to various communications systems, for example: Global System of Mobile Communications (referred to as "GSM") system, Code Division Multiple Access (referred to as "CDMA") system, Wideband Code Division Multiple Access (referred to as "WCDMA") system, General Packet Radio Service (referred to as "GPRS"), long Term Evolution (referred to as "LTE") system, LTE Frequency Division Duplex (referred to as "FDD") system, LTE Time Division Duplex (referred to as "TDD"), Universal Mobile Telecommunication System (referred to as "UMTS"), Worldwide Interoperability for Microwave Access (referred to as "WiMAX") communication system, or future 5G systems.

FIG. 1 shows a wireless communication system 100 to which an embodiment of the present application is applied. The wireless communication system 100 may include a network device 110. The network device 110 may be a device that communicates with a terminal device. The network device 110 may provide communication coverage for a particular geographic area and may communicate with the terminal device (e.g., a UE) located within the coverage area. Optionally, the network device 110 may be a base station (Base Transceiver Station, BTS) in the GSM system or the CDMA system, or may be a base station (NodeB, NB)

in the WCDMA system, or may be an evolved base station (Evolutional Node B, eNB or eNodeB) in the LTE system, or a wireless controller in a Cloud Radio Access Network (CRAN), or the network device may be a relay station, an access point, an in-vehicle device, a wearable device, a network side device in a future 5G network or a network device in a future evolved Public Land Mobile Network (PLMN), or the like.

The wireless communication system 100 also includes at least one terminal device 120 located within the coverage of the network device 110. The terminal device 120 may be mobile or fixed. Optionally, the terminal device 120 may refer to an access terminal, user equipment (User Equipment, UE), a subscriber unit, a subscriber station, a mobile station, a mobile platform, a remote station, a remote terminal, a mobile device, a user terminal, a terminal, and a wireless communication device, a user agent, or a user device. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device or other processing device connected to a wireless modem, an in-vehicle device, a wearable device, a terminal device in future 5G networks, or a terminal device in future evolved PLMN, or the like.

FIG. 2 shows a schematic flowchart of a method 200 for transmitting feedback information according to an embodiment of the present application. As shown in FIG. 2, the method 200 includes the following contents.

In 201, the network device generates Hybrid Automatic Repeat reQuest (HARQ) feedback information, the HARQ feedback information including feedback information of uplink data of at least one terminal device.

In 202, the network device sends the HARQ feedback information to the at least one terminal device by using a downlink data channel.

Specifically, the network device may generate HARQ feedback information, the HARQ feedback information includes HARQ feedback information for uplink data of the at least one terminal device, and the feedback information of the uplink data of each terminal device may include the feedback information for at least one uplink data sent by each terminal device. For example, if the uplink data of the first terminal device includes a plurality of uplink data, the feedback information of the uplink data of the first terminal device includes feedback information for the plurality of uplink data of the first terminal device. Then, the network device sends the HARQ feedback information to the at least one terminal device through a downlink data channel.

Therefore, the method for transmitting feedback information in the embodiments of the present application can display feedback information indicating each terminal device, and the network device can combine the feedback information of the plurality of terminal devices together and send the combined feedback information to the plurality of terminal devices through the downlink data channel. In this way, the overhead of the downlink data channel is reduced. Further, the network device sends the HARQ feedback information by using the downlink data channel, thereby saving the overhead of the control channel.

Optionally, the feedback information of the uplink data of each terminal device in the feedback information of the uplink data of the at least one terminal device includes at least one of the following:

acknowledgment/negative acknowledgment (ACK/NACK) of the uplink data of each terminal device, an identifier (ID) of a HARQ process (Process) of the uplink data of each terminal device, and identification information of each terminal device.

Specifically, in general, the feedback information may include at least one of an ACK/NACK, a HARQ Process ID, and identification information of the terminal device, and the feedback information of the uplink data of the at least one terminal device may include the feedback information for each uplink data for each terminal device.

Optionally, the HARQ feedback information is carried by a Media Access Control (MAC) Control Element (CE) of a MAC layer of the network device.

Specifically, the network device may carry the HARQ feedback information by using a Control Element (referred to as CE) of the Medium Access Control (referred to as MAC), that is, the MAC CE may include at least one item of the above feedback information.

Optionally, the feedback information of the uplink data of each terminal device corresponds to one MAC CE, and each terminal device determines the MAC CE corresponding to each terminal device by using a MAC subheader corresponding to the MAC CE.

That is, the feedback information of the uplink data of each terminal device may correspond to one MAC CE, each MAC CE corresponds to one MAC subheader, and each terminal device may distinguish the feedback information of the uplink data of each terminal device by the MAC subheader corresponding to the MAC CE. Optionally, the feedback information of the uplink data of each terminal device may include at least one item of the foregoing feedback information.

Optionally, the uplink data of the first terminal device of the at least one terminal device includes a plurality of uplink data, and the MAC CE corresponding to the feedback information of the uplink data of the first terminal device includes the feedback information with respect to the plurality of uplink data.

Optionally, as an embodiment, the HARQ feedback information is carried by a MAC Protocol Data Unit (PDU) of a MAC layer of the network device.

That is to say, the network device may also carry the HARQ feedback information through the MAC (Protocol Data Unit, PDU) of the MAC layer, and may carry the HARQ feedback information through the newly defined MAC PDU. When the terminal device receives this type of MAC PDU, it may not feed back.

Optionally, the MAC PDU includes a MAC header and at least one MAC feedback information, the MAC header includes identification information of the at least one terminal device, and each MAC feedback information corresponds to feedback information of uplink data of one terminal device.

Specifically, the MAC PDU may include a MAC header, and the MAC header may include identification information of the at least one terminal device, for example, an identifier (ID) of the at least one terminal device. Optionally, the MAC header may further include feedback information for uplink data of the at least one terminal device, for example, ACK/NACK information or HARQ process ID, or the like.

Optionally, the MAC PDU may further include at least one MAC feedback information, and each MAC feedback information corresponds to feedback information of uplink data of one terminal device, that is, the feedback information of uplink data of the at least one terminal device may be carried in the at least one MAC feedback information, and the at least one MAC feedback information and the feedback information of the uplink data of the at least one terminal device are in one-to-one correspondence. For example, the format of the newly defined MAC PDU may be as shown in Table 1.

TABLE 1

| MAC header | MAC HF1 | MAC HF2 | ... | MAC HFn | Filling bit (optional) |
|---|---|---|---|---|---|

As shown in Table 1, the MAC PDU may include a MAC header, and the MAC PDU may further include at least one MAC feedback information. Each MAC feedback information is represented by a MAC (full name: HARQ Feedback, HF for short). For example, Table 1 includes n pieces of MAC feedback information, where MAC HF1 corresponds to the feedback information of the uplink data of the UE1, MAC HF2 corresponds to the feedback information of the uplink data of the UE2, and MAC HFn corresponds to the feedback information of the uplink data of the UEn. Optionally, the feedback information of the uplink data of each terminal device may include at least one of an ACH/NACK of the uplink data of each terminal device, a HARQ process ID, and an ID of each of the terminal devices. Optionally, the MAC PDU may also include some filling bits.

Optionally, the uplink data of the first terminal device of the at least one terminal device includes a plurality of uplink data, and the MAC feedback information corresponding to the first terminal device includes feedback information for the plurality of uplink data.

That is, if the uplink data of the first terminal device in the least one terminal device includes a plurality of uplink data, the MAC feedback information corresponding to the first terminal device includes feedback information for the plurality of uplink data. For example, the UE1 includes a plurality of uplink data, and the MAC HF1 corresponds to the feedback information of the uplink data of the UE1, then the MAC HF1 includes feedback information of each uplink data of the plurality of uplink data. Optionally, the feedback information of each uplink data may include at least one of an ACK/NACK of each uplink data, a HARQ Process ID of each uplink data, or an ID of the first terminal device.

Optionally, the at least one terminal device includes a plurality of terminal devices, and the HARQ feedback information includes feedback information of the uplink data of the plurality of terminal devices, the method further including:

the network device sending indication information to the plurality of terminal devices by using a shared control channel of the plurality of terminal devices, where the indication information indicates that the plurality of terminal devices receive the HARQ feedback information on a downlink data channel.

Specifically, if the HARQ feedback information is feedback information for uplink data of a plurality of terminal devices, in this case, the network device may send indication information to the plurality of terminal devices through the shared control channel of the plurality of terminal devices. The indication information indicates that the plurality of terminal devices receive the HARQ feedback information on the downlink data channel, where the HARQ feedback information is HARQ feedback information for the plurality of terminal devices, and the shared control channel of the plurality of terminal devices is a control channel that may be used by the plurality of terminal devices. Optionally, the indication information may specifically indicate location information of the downlink data channel. Optionally, the downlink data channel may be a downlink data channel that may be used by each of the plurality of terminal devices.

Optionally, the at least one terminal device includes one terminal device, and the HARQ feedback information includes feedback information of the uplink data of the one terminal device, where the method may further include:

the network device sending indication information to the one terminal device by using a dedicated control channel of the one terminal device, where the indication information indicates that the one terminal device receives the HARQ feedback information on the downlink data channel.

Specifically, if the HARQ feedback information is feedback information for uplink data of one terminal device, in this case, the network device may send indication information to the one terminal device by using a dedicated control channel of the one terminal device. The indication information indicates the one terminal device to receive the HARQ feedback information on the downlink data channel, and the HARQ feedback information is feedback information for uplink data of the one terminal device. Optionally, the indication information may specifically indicate location information of the downlink data channel that includes the HARQ feedback information. Optionally, the downlink data channel may be a downlink data channel dedicated to the one terminal device.

Optionally, the method 200 may further include:

the network device notifying the at least one terminal device of a dedicated identifier of the at least one terminal device by using a high layer signaling, the dedicated identifier of the at least one terminal device being used to indicate that the at least one terminal device demodulates the downlink data channel including the HARQ feedback information.

Specifically, the network device may notify the dedicated identifier of the at least one terminal device by using the high layer signaling, where the dedicated identifier of the at least one terminal device is used to indicate the at least one terminal device to demodulate the downlink data channel including the HARQ feedback information.

Optionally, the high layer signaling is a Radio Resource Control (RRC) signaling.

Optionally, the at least one terminal device includes one terminal device, and the dedicated identifier of the at least one terminal device is the identification information of the one terminal device.

Optionally, the identification information of the one terminal device is a Radio Network Temporary Identifier (RNTI) of the one terminal device.

That is to say, the RNTI of the one terminal device may be used as the dedicated identifier of the one terminal device. The RNTI of the one terminal device may be used by the one terminal device to demodulate a corresponding control channel (for example, the dedicated control channel of the one terminal device for transmitting the indication information mentioned above), and to acquire the location information of the downlink data channel, thereby demodulating the downlink data channel including the HARQ feedback information.

Optionally, the at least one terminal device includes a plurality of terminal devices, and the dedicated identifier of the at least one terminal device is shared identification information of the plurality of terminal devices.

Optionally, the shared identification information of the plurality of terminal devices is a shared RNTI of the plurality of terminal devices.

Specifically, the shared RNTI of the plurality of terminal devices may be used by the plurality of terminal devices to demodulate a corresponding control channel, for example, the shared control channel of the plurality of terminal devices used to transmit the indication information described above, and to acquire the location information of the downlink data channel, thereby demodulating the downlink data channel including the HARQ feedback information.

In the above, the method for transmitting information according to an embodiment of the present application has been described in detail from the perspective of a network device with reference to FIG. 2. Hereinafter, a method for transmitting information according to an embodiment of the present application is described in detail from the perspective of a terminal device. It should be understood that the description on the terminal device side corresponds to the description on the network device side. For a similar description, the above contents may be referred to. To avoid repetition, details are not described herein again.

FIG. 3 is a schematic flowchart of a method for transmitting feedback information according to an embodiment of the present application. As shown in FIG. 3, the method 300 includes the following steps.

In 301, the terminal device receives a downlink data channel that is sent by the network device, where the downlink data channel includes Hybrid Automatic Repeat reQuest (HARQ) feedback information, the HARQ feedback information includes feedback information of uplink data of the at least one terminal device, and the terminal device is one of the at least one terminal device.

In 302, the terminal device demodulates the downlink data channel to obtain the HARQ feedback information.

Specifically, the terminal device may receive a downlink data channel that is sent by the network device, where the downlink data channel includes HARQ feedback information, where the HARQ feedback information includes HARQ feedback information of uplink data of at least one terminal device, and uplink data of each terminal device. The feedback information of the uplink data of the first terminal device includes: Feedback information of the plurality of uplink data of the first terminal device. Thereafter, the terminal device demodulates the downlink data channel to obtain the HARQ feedback information.

Optionally, the feedback information of the uplink data of each terminal device in the feedback information of the uplink data of the at least one terminal device includes at least one of the following:

The acknowledgment/negative of the uplink data of each terminal device determines an ACK/NACK, an identifier ID of the HARQ process Process of the uplink data of each terminal device, and identification information of each terminal device.

Optionally, the HARQ feedback information is carried by a MAC Control Element CE of a medium access control MAC layer of the network device.

Optionally, the feedback information of the uplink data of each terminal device corresponds to one MAC CE, and each terminal device determines the MAC CE corresponding to each terminal device by using a MAC sub-header subheader corresponding to the MAC CE.

Optionally, if the uplink data of the first terminal device of the at least one terminal device includes a plurality of uplink data, the MAC CE corresponding to the feedback information of the uplink data of the first terminal device includes the plurality of uplink data. Feedback.

Optionally, the HARQ feedback information is carried by a MAC protocol data unit PDU of a MAC layer of the network device.

Optionally, the MAC PDU includes a MAC header and at least one MAC feedback information, where the MAC header includes identification information of the at least one terminal device, and each MAC feedback information corresponds to feedback information of uplink data of one terminal device.

Optionally, the uplink data of the first terminal device of the at least one terminal device includes a plurality of uplink data, and the MAC feedback information corresponding to the first terminal device includes feedback information for the plurality of uplink data.

Optionally, the method further includes:

When the terminal device receives the MAC PDU including the HARQ feedback information, it does not return a response message.

That is, the MAC PDU is a newly defined MAC PDU for carrying the HARQ feedback information. When receiving the MAC PDU of this type, the terminal device may not reply a response message.

Optionally, the at least one terminal device includes a plurality of terminal devices, and the HARQ feedback information includes feedback information of the uplink data of the plurality of terminal devices, the method further including:

receiving, by the terminal device, indication information that is sent by the network device by using a shared control channel of the plurality of terminal devices, the indication information indicating the plurality of terminal devices to receive the HARQ feedback information on the downlink data channel.

Specifically, the indication information may further specifically indicate location information of the downlink data channel of the plurality of terminal devices.

Optionally, the at least one terminal device includes one terminal device, and the HARQ feedback information includes feedback information of the uplink data of the one terminal device, the method further including:

receiving, by the terminal device, indication information that is sent by the network device by using a dedicated control channel of the one terminal device, the indication information indicating the one terminal device to receive the HARQ feedback information on the downlink data channel.

Optionally, the method further includes:

receiving, by the terminal device, a high layer signaling sent by the network device, the high layer signaling including a dedicated identifier of the at least one terminal device, and the dedicated identifier of the at least one terminal device being used to indicate the at least one terminal device to demodulate the downlink data channel including the HARQ feedback information.

Optionally, the high layer signaling is a Radio Resource Control (RRC) signaling.

Optionally, the at least one terminal device includes one terminal device, and the dedicated identifier of the at least one terminal device is identification information of the one terminal device.

Optionally, the identification information of the one terminal device is a Radio Network Temporary Identifier (RNTI) of the one terminal device.

That is to say, the RNTI of the one terminal device may be used as the dedicated identifier of the one terminal device. The RNTI of the one terminal device may be used by the one terminal device to demodulate a corresponding control channel, for example, the dedicated control channel of the one terminal device for transmitting the indication information as mentioned above, and acquire the location information of the downlink data channel, thereby demodulating the downlink data channel including the HARQ feedback information.

Optionally, the at least one terminal device includes a plurality of terminal devices, and the dedicated identifier of the at least one terminal device is shared identification information of the plurality of terminal devices.

Optionally, the shared identification information of the plurality of terminal devices is a shared RNTI of the plurality of terminal devices.

That is to say, the shared RNTI of the plurality of terminal devices may be used as the dedicated identifier of the plurality of terminal devices. The shared RNTI of the plurality of terminal devices may be used by the plurality of terminal devices to demodulate a corresponding control channel, for example, the shared control channel of the plurality of terminal devices used to transmit the indication information mentioned above, and acquire location information of the downlink data channel, thereby demodulating the downlink data channel including the HARQ feedback information.

Optionally, the method further includes:

demodulating, by the terminal device, a control channel according to the dedicated identifier of the at least one terminal device; and demodulating the downlink data channel including the HARQ feedback information according to the demodulated control channel.

Specifically, if the at least one terminal device includes only one terminal device, the dedicated identifier of the at least one terminal device may be an RNTI of the one terminal device, and the network device may notify the terminal device of the RNTI by using the high layer signaling, so that the terminal device demodulates a corresponding control channel according to the RNTI, for example, the dedicated control channel of the one terminal device for transmitting the indication information as mentioned above, and acquires location information of the downlink data channel, thereby demodulating the downlink data channel including the HARQ feedback information.

Alternatively, if the at least one terminal device includes only a plurality of terminal devices, the dedicated identifier of the at least one terminal device may be a shared RNTI of the plurality of terminal devices, and the network device may notify the plurality of terminal devices of the shared RNTI by using the high layer signaling. Therefore, the plurality of terminal devices can demodulate the corresponding control channel according to the RNTI, for example, the shared control channel of the plurality of terminal devices for transmitting the indication information mentioned above, and obtain the location information of the downlink data channel, thereby demodulating the downlink data channel including the HARQ feedback information.

Optionally, the method may further include:

if the terminal device does not successfully demodulate the downlink data channel, the terminal device does not reply with a response message.

Specifically, if the terminal device does not successfully demodulate the downlink data channel, the terminal device may not reply with a response message. If the terminal device successfully demodulates the downlink data channel, the terminal device may not reply with a response message.

The method embodiments of the present disclosure are described in detail above with reference to FIG. 2 to FIG. 3, and the device embodiments of the present disclosure are described in detail below with reference to FIG. 4 to FIG. 7. It should be understood that the device embodiments and the method embodiments correspond to each other, and similar description may be referred to the method embodiments.

FIG. 4 shows a schematic block diagram of a network device 400 according to an embodiment of the present application. As shown in FIG. 4, the network device 400 includes: a generating unit 410, and a sending unit 420.

The generating unit 410 is configured to generate Hybrid Automatic Repeat reQuest (HARQ) feedback information, the HARQ feedback information including feedback information of uplink data of at least one terminal device.

The sending unit 420 is configured to send the HARQ feedback information to the at least one terminal device by using a downlink data channel.

Optionally, in some embodiments, the feedback information of the uplink data of each terminal device in the feedback information of the uplink data of the at least one terminal device includes at least one of the following:

acknowledgment/negative acknowledgment (ACK/NACK) of the uplink data of each terminal device, an identifier (ID) of a HARQ process (Process) of the uplink data of each terminal device, and identification information of each terminal device.

Optionally, in some embodiments, the HARQ feedback information is carried by a Media Access Control (MAC) Control Element (CE) of a MAC layer of the network device.

Optionally, in some embodiments, the feedback information of the uplink data of each terminal device corresponds to one MAC CE, and each terminal device determines MAC CE corresponding to each terminal device by a MAC subheader corresponding to the MAC CE.

Optionally, in some embodiments, the uplink data of a first terminal device of the at least one terminal device includes a plurality of uplink data, and the MAC CE corresponding to the feedback information of the uplink data of the first terminal device includes feedback information with respect to the plurality of uplink data.

Optionally, in some embodiments, the HARQ feedback information is carried by a MAC Protocol Data Unit (PDU) of the MAC layer of the network device.

Optionally, in some embodiments, the MAC PDU includes a MAC header and at least one MAC feedback information, the MAC header includes identification information of the at least one terminal device, and each MAC feedback information corresponds to the feedback information of the uplink data one terminal device.

Optionally, in some embodiments, the uplink data of the first terminal device of the at least one terminal device includes a plurality of uplink data, and the MAC feedback information corresponding to the first terminal device includes the feedback information for the plurality of uplink data.

Optionally, in some embodiments, the at least one terminal device includes a plurality of terminal devices, the HARQ feedback information includes the feedback information of the uplink data of the plurality of terminal devices, and the sending unit 420 is further configured to:

sending, by a shared control channel of the plurality of terminal devices, indication information to the plurality of terminal devices, the indication information indicating that the plurality of terminal devices receive the HARQ feedback information on the downlink data channel.

Optionally, in some embodiments, the at least one terminal device includes one terminal device, the HARQ feedback information includes the feedback information of the uplink data of the one terminal device, and the sending unit 420 is further configured to:

sending, by a dedicated control channel of the one terminal device, indication information to the one terminal device, the indication information indicating that the one terminal device receives the HARQ feedback information on the downlink data channel.

Optionally, in some embodiments, the sending unit 420 is further configured to:

notifying the at least one terminal device of a dedicated identifier of the at least one terminal device by using a high layer signaling, the dedicated identifier of the at least one terminal device being used to indicate the at least one terminal device to demodulate the downlink data channel including the HARQ feedback information.

Optionally, in some embodiments, the high layer signaling is a Radio Resource Control (RRC) signaling.

Optionally, in some embodiments, the at least one terminal device includes one terminal device, and the dedicated identifier of the at least one terminal device is the identification information of the one terminal device.

Optionally, in some embodiments, the identification information of the one terminal device is a Radio Network Temporary Identifier (RNTI) of the one terminal device.

Optionally, in some embodiments, the at least one terminal device includes a plurality of terminal devices, and the dedicated identifier of the at least one terminal device is shared identification information of the plurality of terminal devices.

Optionally, in some embodiments, the shared identification information of the plurality of terminal devices is a shared RNTI of the plurality of terminal devices.

It should be understood that the network device 400 may correspond to the network device in the method 200, and may implement the corresponding functions of the network device. For brevity, no further details are provided herein.

Figure 5:
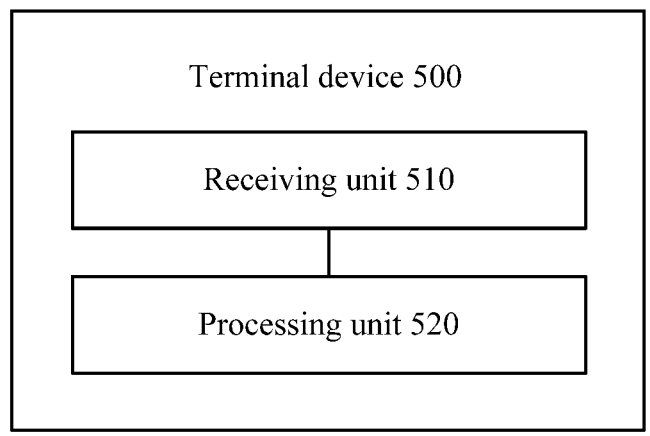
FIG. 5 is a schematic block diagram of a terminal device according to an embodiment of the present application.

FIG. 5 is a schematic block diagram of a terminal device 500 according to an embodiment of the present application. As shown in FIG. 5, the terminal device 500 includes: a receiving unit 510 and a processing unit 520.

The receiving unit 510 is configured to receive a downlink data channel that is sent by a network device, the downlink data channel including Hybrid Automatic Repeat reQuest (HARQ) feedback information, the HARQ feedback information including feedback information of uplink data of the at least one terminal device, and the terminal device is one of the at least one terminal device.

The processing unit 520 is configured to demodulate the downlink data channel, and obtain the HARQ feedback information.

Optionally, in some embodiments, the feedback information of the uplink data of each terminal device in the feedback information of the uplink data of the at least one terminal device includes at least one of the following:

acknowledgment/negative acknowledgment (ACK/NACK) of the uplink data of each terminal device, an identifier (ID) of a HARQ process (Process) of the uplink data of each terminal device, and identification information of each terminal device.

Optionally, in some embodiments, the HARQ feedback information is carried by a Media Access Control (MAC) Control Element (CE) of a MAC layer of the network device.

Optionally, in some embodiments, the feedback information of the uplink data of each terminal device corresponds to one MAC CE, and each of the terminal devices determines, by using a MAC subheader corresponding to the MAC CE, MAC CE corresponding to terminal device.

Optionally, in some embodiments, if the uplink data of a first terminal device of the at least one terminal device includes a plurality of uplink data, the MAC CE corresponding to the feedback information of the uplink data of the first terminal device includes the feedback information of the plurality of uplink data.

Optionally, in some embodiments, the HARQ feedback information is carried by a MAC Protocol Data Unit (PDU) of the MAC layer of the network device.

Optionally, in some embodiments, the MAC PDU includes a MAC header and at least one MAC feedback information, the MAC header includes identification information of the at least one terminal device, and each MAC feedback information corresponds to the feedback information of the uplink data of one terminal device.

Optionally, in some embodiments, the uplink data of the first terminal device of the at least one terminal device includes a plurality of uplink data, and the MAC feedback information corresponding to the first terminal device includes the feedback information for the plurality of uplink data.

Optionally, in some embodiments, the method further includes:

when the terminal device receives the MAC PDU including the HARQ feedback information, it does not reply with a response message.

Optionally, in some embodiments, the at least one terminal device includes a plurality of terminal devices, the HARQ feedback information includes feedback information of the uplink data of the plurality of terminal devices, and the receiving unit 510 is further configured to:

receive indication information that is sent by the network device using a shared control channel of the plurality of terminal devices, the indication information indicating that the plurality of terminal devices receive the HARQ feedback information on the downlink data channel.

Optionally, in some embodiments, the at least one terminal device includes one terminal device, the HARQ feedback information includes the feedback information of the uplink data of the one terminal device, and the receiving unit 510 is further configured to:

receiving indication information that is sent by the network device using a dedicated control channel of the one terminal device, the indication information indicating that the one terminal device receives the HARQ feedback information on the downlink data channel.

Optionally, in some embodiments, the receiving unit 510 is further configured to:

receive a high layer signaling sent by the network device, the high layer signaling including a dedicated identifier of the at least one terminal device, and the dedicated identifier of the at least one terminal device being used to indicate that the at least one terminal device demodulates the downlink data channel including the HARQ feedback information.

Optionally, in some embodiments, the high layer signaling is Radio Resource Control (RRC) signaling.

Optionally, in some embodiments, the at least one terminal device includes one terminal device, and the dedicated identifier of the at least one terminal device is the identification information of the one terminal device.

Optionally, in some embodiments, the identification information of the one terminal device is a Radio Network Temporary Identifier (RNTI) of the one terminal device.

Optionally, in some embodiments, the at least one terminal device includes a plurality of terminal devices, and the dedicated identifier of the at least one terminal device is shared identification information of the plurality of terminal devices.

Optionally, in some embodiments, the shared identification information of the plurality of terminal devices is a shared RNTI of the plurality of terminal devices.

Optionally, in some embodiments, the processing unit 520 is further configured to:

demodulate a control channel according to the dedicated identifier of the at least one terminal device, and demodulate the downlink data channel including the HARQ feedback information according to the demodulated control channel.

Optionally, in some embodiments, the receiving unit 510 is further configured to:

when the terminal device does not successfully demodulate the downlink data channel, not reply with a response message.

It should be understood that the terminal device 500 may correspond to the terminal device in the method 300, and the corresponding functions of the terminal device may be implemented. For brevity, no further details are provided herein.

Figure 6:
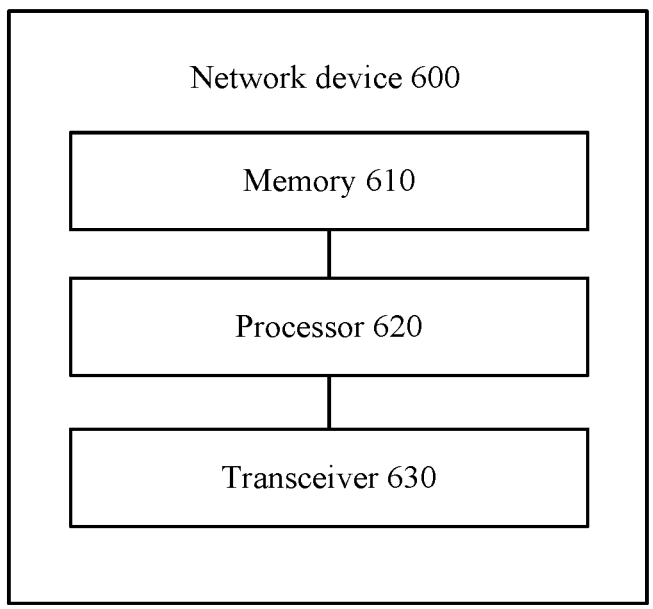
FIG. 6 is a schematic block diagram of a network device according to an embodiment of the present application.

FIG. 6 shows a schematic block diagram of a network device 600 according to an embodiment of the present application. As shown in FIG. 6, the network device 600 includes a memory 610, a processor 620, and a transceiver 630, the memory 610 is used for storing a program, the processor 620 is used for executing the program, and when the program is executed, the processor 620 may generate Hybrid Automatic Repeat reQuest (HARQ) feedback information, the HARQ feedback information including feedback information of uplink data of at least one terminal device; and the transceiver 630 may send the HARQ feedback information to the at least one terminal device by using a downlink data channel.

Optionally, in some embodiments, the feedback information of the uplink data of each terminal device in the feedback information of the uplink data of the at least one terminal device includes at least one of the following:

acknowledgment/negative acknowledgment (ACK/NACK) of the uplink data of each terminal device, an identifier (ID) of a HARQ process (Process) of the uplink data of each terminal device, and identification information of each terminal device.

Optionally, in some embodiments, the HARQ feedback information is carried by a Media Access Control (MAC) Control Element (CE) of a MAC layer of the network device.

Optionally, in some embodiments, the feedback information of the uplink data of each terminal device corresponds to one MAC CE, and each of the terminal devices determines MAC CE corresponding to each terminal device by using a MAC subheader corresponding to the MAC CE.

Optionally, in some embodiments, the uplink data of a first terminal device of the at least one terminal device includes a plurality of uplink data, and the MAC CE corresponding to the feedback information of the uplink data of the first terminal device includes feedback information for the plurality of uplink data.

Optionally, in some embodiments, the HARQ feedback information is carried by a MAC Protocol Data Unit (PDU) of the MAC layer of the network device.

Optionally, in some embodiments, the MAC PDU includes a MAC header and at least one MAC feedback information, the MAC header includes identification information of the at least one terminal device, and each MAC feedback information corresponds to the feedback information of the uplink data of one terminal device.

Optionally, in some embodiments, the uplink data of the first terminal device of the at least one terminal device includes a plurality of uplink data, and the MAC feedback information corresponding to the first terminal device includes the feedback information for the plurality of uplink data.

Optionally, in some embodiments, the at least one terminal device includes a plurality of terminal devices, the HARQ feedback information includes the feedback information of uplink data of the plurality of terminal devices, and the transceiver 630 is further configured to:

send indication information to the plurality of terminal devices by using a shared control channel of the plurality of terminal devices, the indication information indicating that the plurality of terminal devices receive the HARQ feedback information on the downlink data channel.

Optionally, in some embodiments, the at least one terminal device includes one terminal device, the HARQ feedback information includes the feedback information of the uplink data of the one terminal device, and the transceiver 630 is further configured to:

send indication information to the one terminal device by using a dedicated control channel of the one terminal device, the indication information indicating that the one terminal device receives the HARQ feedback information on the downlink data channel.

Optionally, in some embodiments, the transceiver 630 is further configured to:

notify the at least one terminal device of a dedicated identifier to the at least one terminal device by a high layer signaling, the dedicated identifier of the at least one terminal device being used to instruct the at least one terminal device to demodulate the downlink data channel including the HARQ feedback information.

Optionally, in some embodiments, the high layer signaling is a Radio Resource Control (RRC) signaling.

Optionally, in some embodiments, the at least one terminal device includes one terminal device, and the dedicated identifier of the at least one terminal device is the identification information of the one terminal device.

Optionally, in some embodiments, the identification information of the one terminal device is a Radio Network Temporary Identifier (RNTI) of the one terminal device.

Optionally, in some embodiments, the at least one terminal device includes a plurality of terminal devices, and the dedicated identifier of the at least one terminal device is shared identification information of the plurality of terminal devices.

Optionally, in some embodiments, the shared identification information of the plurality of terminal devices is a shared RNTI of the plurality of terminal devices.

It should be understood that the network device 600 may correspond to the network device in the method 200, and the corresponding functions of the network device may be implemented. For brevity, no further details are provided herein.

Figure 7:
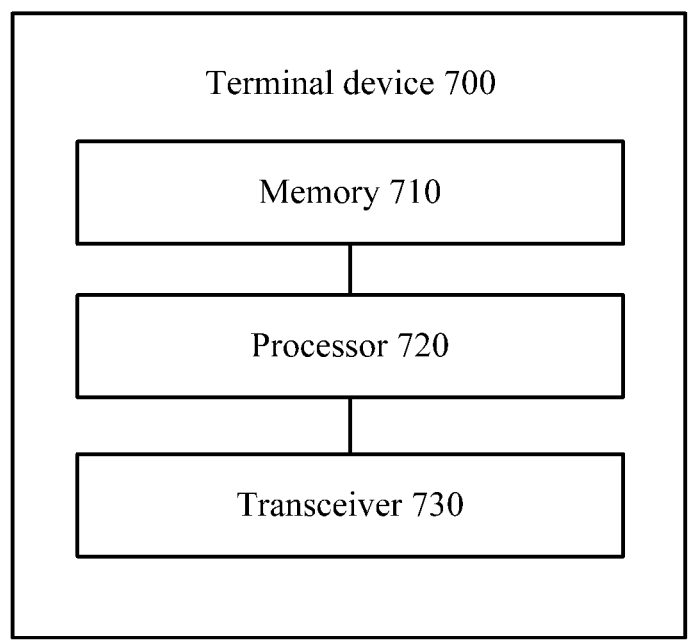
FIG. 7 is a schematic block diagram of a terminal device according to an embodiment of the present application.

FIG. 7 is a schematic block diagram of a terminal device 700 according to an embodiment of the present application. As shown in FIG. 7, the terminal device 700 includes a memory 710, a processor 720, and a transceiver 730. The memory 710 is used for storing a program, the processor is used for executing the program, and when the program is executed, the processor 720 may receive, by using the transceiver 730, a downlink data channel that is sent by the network device. The downlink data channel includes Hybrid Automatic Repeat reQuest (HARQ) feedback information. The HARQ feedback information includes feedback information of uplink data of the at least one terminal device. The terminal device is one of the at least one terminal device. The processor 720 is further configured to demodulate the downlink data channel, and obtain the HARQ feedback information.

Optionally, in some embodiments, the feedback information of the uplink data of each terminal device in the feedback information of the uplink data of the at least one terminal device includes at least one of the following:

acknowledgment/negative acknowledgment (ACK/NACK) of the uplink data of each terminal device, an identifier (ID) of a HARQ process (Process) of the uplink data of each terminal device, and identification information of each terminal device.

Optionally, in some embodiments, the HARQ feedback information is carried by a Media Access Control (MAC) Control Element (CE) of a MAC layer of the network device.

Optionally, in some embodiments, the feedback information of the uplink data of each terminal device corresponds to one MAC CE, and each of the terminal devices determines MAC CE corresponding to each terminal device by using a MAC subheader corresponding to the MAC CE.

Optionally, in some embodiments, if the uplink data of a first terminal device of the at least one terminal device includes a plurality of uplink data, the MAC CE corresponding to the feedback information of the uplink data of the first terminal device includes the feedback information of a plurality of uplink data.

Optionally, in some embodiments, the HARQ feedback information is carried by a MAC Protocol Data Unit (PDU) of the MAC layer of the network device.

Optionally, in some embodiments, the MAC PDU includes a MAC header and at least one MAC feedback information, the MAC header includes identification information of the at least one terminal device, and each MAC feedback information corresponds the feedback information of the uplink data of one terminal device.

Optionally, in some embodiments, the uplink data of the first terminal device of the at least one terminal device includes a plurality of uplink data, and the MAC feedback information corresponding to the first terminal device includes the feedback information for the plurality of uplink data.

Optionally, in some embodiments, the method further includes:

when the terminal device receives the MAC PDU including the HARQ feedback information, it does not reply with a response message.

Optionally, in some embodiments, the at least one terminal device includes a plurality of terminal devices, the HARQ feedback information includes feedback information of uplink data of the plurality of terminal devices, and the transceiver 730 is further configured to:

receive indication information that is sent by the network device using a shared control channel of the plurality of terminal devices, the indication information indicating that the plurality of terminal devices receive the HARQ feedback information on the downlink data channel.

Optionally, in some embodiments, the at least one terminal device includes one terminal device, the HARQ feedback information includes the feedback information of the uplink data of the one terminal device, and the transceiver 730 is further configured to:

Receive indication information that is sent by the network device using a dedicated control channel of the one terminal device, the indication information indicating that the one terminal device receives the HARQ feedback information on the downlink data channel.

Optionally, in some embodiments, the transceiver 730 is further configured to:

receive a high layer signaling sent by the network device, the high layer signaling including a dedicated identifier of the at least one terminal device, and the dedicated identifier of the at least one terminal device being used to indicate that the at least one terminal device demodulates the downlink data channel including the HARQ feedback information.

Optionally, in some embodiments, the high layer signaling is Radio Resource Control (RRC) signaling.

Optionally, in some embodiments, the at least one terminal device includes one terminal device, and the dedicated identifier of the at least one terminal device is the identification information of the one terminal device.

Optionally, in some embodiments, the identification information of the one terminal device is a Radio Network Temporary Identifier (RNTI) of the one terminal device.

Optionally, in some embodiments, the at least one terminal device includes a plurality of terminal devices, and the dedicated identifier of the at least one terminal device is shared identification information of the plurality of terminal devices.

Optionally, in some embodiments, the shared identification information of the plurality of terminal devices is a shared RNTI of the plurality of terminal devices.

Optionally, in some embodiments, the processor 720 is further configured to:

demodulate a control channel according to the dedicated identifier of the at least one terminal device, and demodulate the downlink data channel including the HARQ feedback information according to the demodulated control channel.

Optionally, in some embodiments, the transceiver 730 is further configured to:

when the terminal device does not successfully demodulate the downlink data channel, not reply with a response message.

It should be understood that the terminal device 700 may correspond to the terminal device in the method 300, and the corresponding functions of the terminal device may be implemented. For brevity, no further details are provided herein.

It should be understood that the term "and/or" herein is merely an association relationship describing associated objects, indicating that there may be three relationships, for example, A and/or B may indicate three conditions: A exists separately, A and B exist simultaneously, B exists separately. In addition, the character "/" in this disclosure generally indicates an "or" relationship between the contextual objects.

It should be understood that, in various embodiments of the present disclosure, the sequence numbers of the above processes does not mean the order of execution, and the order of execution of each process should be determined by its function and internal logic, and should not limit the implementation process of the embodiments of the present disclosure.

Those of ordinary skill in the art will appreciate that the units and algorithm steps of individual examples described in connection with the embodiments disclosed herein can be implemented in electronic hardware or a combination of computer software and electronic hardware. Whether these functions are performed in hardware or software depends on the specific application and design constraints of the technical solution. A person skilled in the art can use different methods for implementing the described functions for each particular application, but such implementation should not be considered to be beyond the scope of the present application.

It is clear to those skilled in the art that, for the convenience and simplicity of the description, the specific working processes of the systems, devices and units described above may refer to the corresponding processes in the embodiments of the methods described above, and will not be repeated here.

In the several embodiments provided by the present application, it should be understood that the disclosed systems, devices, and methods may be implemented in other manners. For example, the device embodiments described above are merely illustrative. For example, the division of the unit is only a logical function division. In actual implementation, there may be other division manner, for example, a plurality of units or components may be combined or may be integrated into another system, or some features may be ignored or not executed. In addition, the coupling or direct coupling or communication connection shown or discussed herein may be an indirect coupling or communication connection through some interfaces, devices or units, and may be electrical, mechanical or otherwise.

The units described as separate components may or may not be physically separated, and the components displayed as units may or may not be physical units, that is, may be located in one place, or may be distributed to a plurality of network units. Some or all of the units may be selected according to actual needs to achieve the purpose of the solution of the embodiments.

In addition, each functional unit in each embodiment of the present application may be integrated into one processing unit, or each unit may exist physically and separately, or two or more units may be integrated into one unit.

The functions may be stored in a computer readable storage medium if implemented in the form of a software functional unit and sold or used as a standalone product. In view of this, the technical solution of the present disclosure, or the part of the solutions contributing to the prior art or the part of the technical solutions, may be embodied in the form of a software product, and the computer software product is stored in a storage medium and includes instructions for causing a computer device (which may be a personal computer, server, or network device, etc.) to perform all or part of the steps of the methods described in various embodiments of the present disclosure. The foregoing storage medium may include various mediums for storing program codes, such as a USB drive, a mobile hard disk, a Read-Only Memory (ROM), a Random Access Memory (RAM), a magnetic disk, or an optical disk.

The above is only the specific embodiments of the present disclosure, and the protection scope of the present disclosure is not limited thereto. Any of changes or substitutions that could be thought of by the ordinary skill in the art within the technical scope of the present disclosure should be covered by the protection scope of the present disclosure. Therefore, the protection scope of the present disclosure should be determined by the protection scope of the appended claims.

What is claimed is:

1. A method for transmitting feedback information, comprising:
  receiving, by a terminal device, a downlink data channel sent by a network device, the downlink data channel comprising Hybrid Automatic Repeat reQuest (HARQ) feedback information, the HARQ feedback information comprising feedback information of uplink data of the at least one terminal device, and the terminal device being one of the at least one terminal device; and
  demodulating, by the terminal device, the downlink data channel to obtain the HARQ feedback information;
  receiving a high layer signaling sent by the network device, the high layer signaling comprising a dedicated identifier of the at least one terminal device, and the dedicated identifier of the at least one terminal device being used to indicate the at least one terminal device to demodulate the downlink data channel comprising the HARQ feedback information;
  wherein the at least one terminal device comprises a plurality of terminal devices UE1 to UEn, n being a positive integer, and the dedicated identifier of the at least one terminal device is shared identification information of the plurality of terminal devices;
  wherein the HARQ feedback information is carried by a newly defined Media Access Control (MAC) Protocol Data Unit (PDU) of a MAC layer of the network device; the MAC PDU comprises a MAC header, at least one MAC feedback information MAC HF1 to MAC HFn, and filling bits, the MAC header comprises identification information of the UE1 to UEn, and each of the MAC HF1 to MAC HFn corresponds to the feedback information of the uplink data of corresponding one of the UE1 to UEn;
  wherein the uplink data of a UEi comprises a plurality of uplink data, and MAC HFi corresponding to the UEi comprises the feedback information with respect to the plurality of uplink data, $0<i \le n$, i being a positive integer.

2. A terminal device, comprising:
  a processor; and
  a memory for storing instructions executable by the processor;
  wherein the processor is configured to:
  receive a downlink data channel that is sent by a network device, the downlink data channel comprising Hybrid Automatic Repeat reQuest (HARQ) feedback information, the HARQ feedback information comprising feedback information of uplink data of the at least one terminal device, and the terminal device being one of the at least one terminal device; and
  demodulate the downlink data channel to obtain the HARQ feedback information; and
  receive a high layer signaling sent by the network device, the high layer signaling comprising a dedicated identifier of the at least one terminal device, and the dedicated identifier of the at least one terminal device being used to indicate the at least one terminal device to demodulate the downlink data channel comprising the HARQ feedback information,
  wherein the at least one terminal device comprises a plurality of terminal devices UE1 to UEn, n being a positive integer, and the dedicated identifier of the at least one terminal device is shared identification information of the plurality of terminal devices;
  wherein the HARQ feedback information is carried by a newly defined Media Access Control (MAC) Protocol Data Unit (PDU) of a MAC layer of the network device; the MAC PDU comprises a MAC header, at least one MAC feedback information MAC HF1 to MAC HFn, and filling bits, the MAC header comprises identification information of the UE1 to UEn, and each of the MAC HF1 to MAC HFn corresponds to the feedback information of the uplink data of corresponding one of the UE1 to UEn;

wherein the uplink data of a UEi comprises a plurality of uplink data, and MAC HFi corresponding to the UEi comprises the feedback information with respect to the plurality of uplink data, $0 < i \leq n$, i being a positive integer.

3. The terminal device according to claim 2, wherein the feedback information of the uplink data of each terminal device in the feedback information of the uplink data of the at least one terminal device comprises at least one of the following:

acknowledgment/negative acknowledgment (ACK/NACK) of the uplink data of each terminal device, an identifier (ID) of a HARQ process of the uplink data of each terminal device, and identification information of each terminal device.

4. The terminal device according to claim 2, wherein the HARQ feedback information is carried by a Media Access Control (MAC) Control Element (CE) of a MAC layer of the network device.

5. The terminal device according to claim 4, wherein the feedback information of the uplink data of each terminal device corresponds to one MAC CE, and each terminal device determines MAC CE corresponding to each terminal device by a MAC subheader corresponding to the MAC CE.

6. The terminal device according to claim 5, wherein the uplink data of a first terminal device of the at least one terminal device comprises a plurality of uplink data, and the MAC CE corresponding to the feedback information of the uplink data of the first terminal device comprises feedback information with respect to the plurality of uplink data.

7. The terminal device according to claim 2, wherein the processor is further configured to:

not reply with a response message when the terminal device receives the MAC PDU comprising the HARQ feedback information.

8. The terminal device according to claim 2, wherein the high layer signaling is a Radio Resource Control (RRC) signaling.

9. The terminal device according to claim 2, wherein the identification information of the one terminal device is a Radio Network Temporary Identifier (RNTI) of the one terminal device.

10. The terminal device according to claim 2, wherein the shared identification information of the plurality of terminal devices is a shared RNTI of the plurality of terminal devices.

11. The terminal device according to claim 2, wherein the processor is further configured to:

demodulate a control channel according to the dedicated identifier of the at least one terminal device, and demodulate the downlink data channel comprising the HARQ feedback information according to the demodulated control channel.

12. The terminal device according to claim 2, wherein the processor is further configured to:

not reply with a message when the terminal device does not successfully demodulate the downlink data channel.

13. The terminal device according to claim 2, wherein the at least one terminal device comprises a plurality of terminal devices, and the HARQ feedback information comprises the feedback information of the uplink data of the plurality of terminal devices, the processor being further configured to:

receive indication information that is sent by the network device using a shared control channel of the plurality of terminal devices, the indication information indicating the plurality of terminal devices to receive the HARQ feedback information on the downlink data channel.

* * * * *